July 1, 1947.　　　T. P. SIMPSON　　　2,423,411
METHOD AND APPARATUS FOR TRANSFERRING PARTICLE FORM SOLIDS
Filed Jan. 19, 1944　　　3 Sheets-Sheet 1
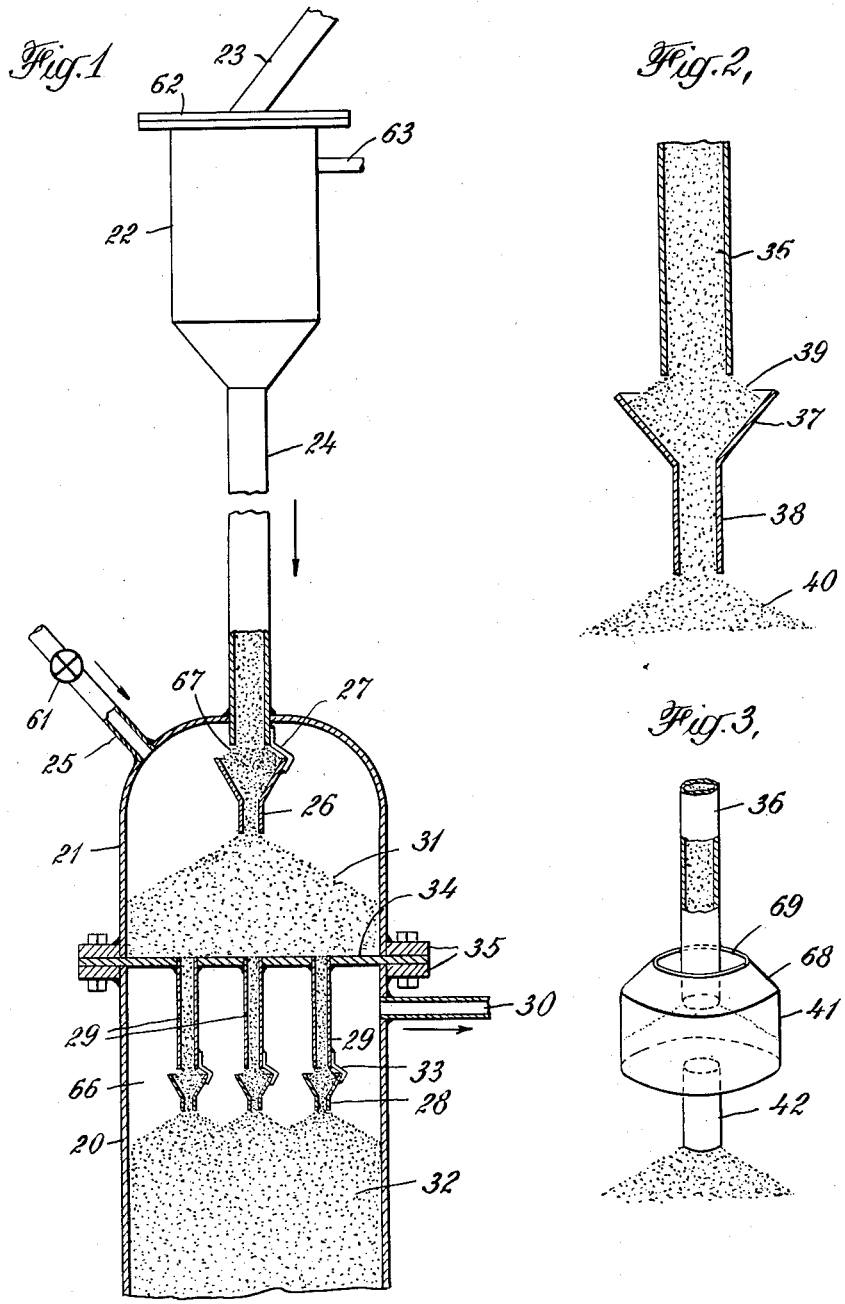
INVENTOR.
THOMAS P SIMPSON
BY
ATTORNEY.

July 1, 1947. T. P. SIMPSON 2,423,411
METHOD AND APPARATUS FOR TRANSFERRING PARTICLE FORM SOLIDS
Filed Jan. 19, 1944 3 Sheets-Sheet 2
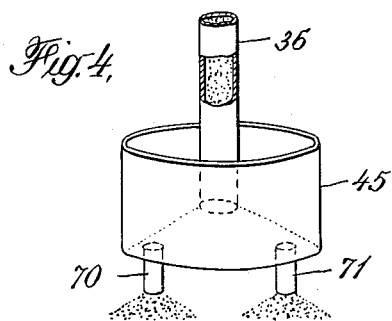
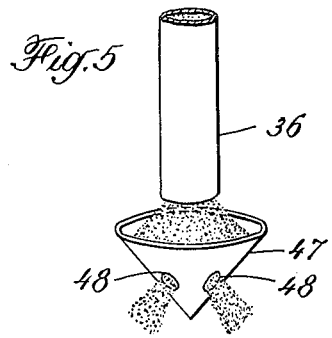
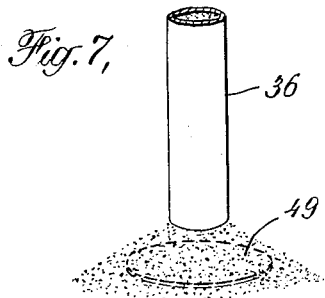
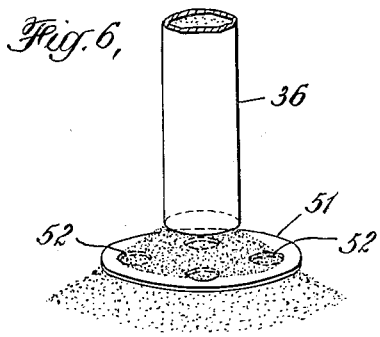
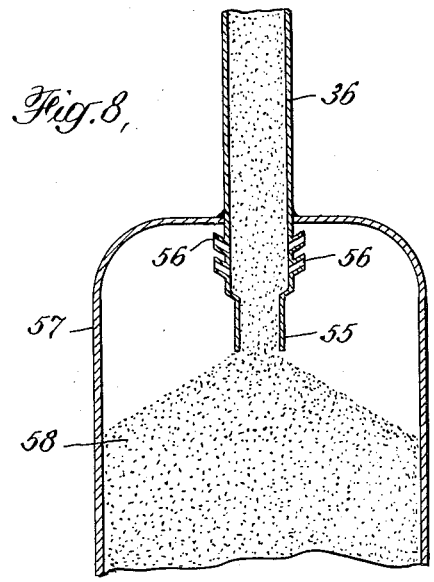
INVENTOR.
Thomas P. Simpson
BY
ATTORNEY.

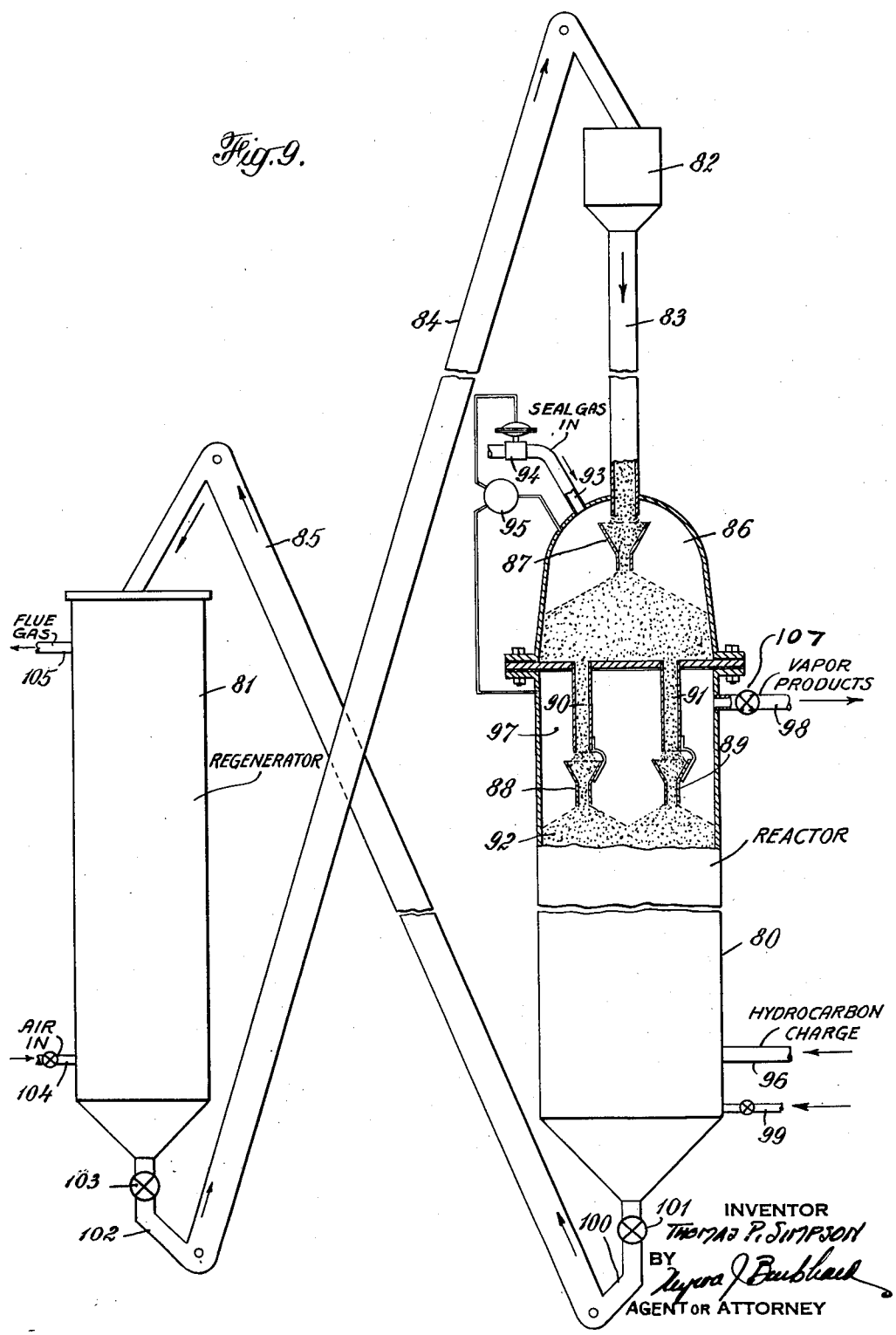

Patented July 1, 1947

2,423,411

UNITED STATES PATENT OFFICE 2,423,411

METHOD AND APPARATUS FOR TRANSFERRING PARTICLE FORM SOLIDS

Thomas P. Simpson, Woodbury, N. J., assignor to Socony-Vacuum Oil Company, Incorporated, a corporation of New York Application January 19, 1944, Serial No. 518,820

9 Claims. (Cl. 196—52)

This invention has to do with a method and apparatus for transferring particle form solid material between two zones or vessels operating under substantially different gaseous pressures. It is specifically directed to those processes wherein a particle form solid material is transferred by gravity flow from one vessel to another therebelow or wherein particle form solid material is withdrawn by gravity flow from a vessel operating under gaseous pressure. Such vessels may be conversion vessels, storage vessels, contacting vessels, properly housed mechanical conveyors or vessels used for other purposes. The solid material may be inert, adsorptive or catalytic in nature depending upon its use in the specific process but should be of a particle form susceptible to gravity flow through confining conduits.

Exemplary of processes of this type is a recently developed process for continuous cracking conversion of hydrocarbons wherein a particle form solid catalytic contact mass material passes cyclically through zones or vessels in the first of which it is contacted with hydrocarbon vapors for purpose of cracking said hydrocarbons usually at some super-atmospheric pressure and in the second of which the contaminant materials formed on the contact mass during the reaction are burned off usually at super-atmospheric pressure by means of a fluid regenerating medium such as a combustion supporting gas. In such a process the contact mass material may be continuously passed from the lower end of the regenerator vessel to a suitable mechanical elevator operating at substantially atmospheric pressure and conveyed to a surge or supply hopper located elevationally above the reactor vessel and then gravitated to the reactor vessel against a pressure therein and likewise contact material may be passed from the bottom of the reactor vessel to a conveyor which delivers it to a surge or supply hopper above the regenerator vessel.

A simple means for introduction and withdrawal of contact mass material to the vessels in such a process without the loss of pressure therein or without excessive loss of vapor therefrom is the use of elongated conduits or pipes having a cross sectional area substantially less than that of the vessels wherein the contact mass material flows in substantially compact columns. If the flow of contact material from the lower or outlet end of such conduits or pipes is not throttled, and contact material is permitted to freely flow into the upper or inlet end of said pipes, a condition of so called "free flow" of contact material particles is obtained in the pipes. Thus due to the normal acceleration of gravity the particles at the lower end of the pipes are falling downwardly at a higher velocity than those at the inlet end thereof so that, except for a very short length adjacent the upper or inlet end of said pipes, the contact material does not entirely fill the pipes nor form a substantially compact column therein.

The total volumetric rate of particle form solid material flow and the linear velocity of the particles near the lower end of a pipe under free flow conditions may vary widely depending upon the gaseous pressure differential between the upper and lower end of the pipe and upon whether the higher pressure exists at the lower or upper end of the pipe; but in any case, provided the gas flow through the pipe is not sufficient to interfere seriously with the entrance of the solid material particles to the pipe, the volumetric rate of flow of solid material from the lower end of the pipe will be representative of the maximum possible rate of flow from said pipe under the existing gas pressure differential between its ends. Generally, and especially for smaller size pipes where the arrangement for solid entrance to the pipe is made such as to avoid entrance complications, the volumetric rate of flow of solid material from the lower end of the pipe will be greater under free flow conditions than that occurring if the flow of said material is throttled near the lower end of said pipe so as to maintain said pipe thereabove substantially filled with a substantially compact column of downwardly flowing particle form solid material with the same pressure differential existing between the upper end and the lower end of the pipe. It is with this meaning that the terms "free flow" and "at a rate lower than that corresponding to free flow in the pipe" or equivalent phrases will be used in the description and claiming of this invention.

It will be apparent that under conditions of free flow in feed or discharge pipes to or from vessels operating under gaseous pressure, excessive quantities of gases from the vessels involved may escape therethrough. That this is highly objectionable in most processes may be readily seen by considering the result of such an escape of hydrocarbon vapors from a cracking reaction vessel, operating under, for example, 10 pounds per square inch gauge pressure and 800° F. temperature or higher, through its contact material outlet or inlet pipe, which pipe connects into an external conveyor or supply hopper which in turn may be vented to the atmospheric air. Obviously then, it is usually necessary in such processes to throttle the flow of contact material from the lower or outlet ends of feed or drain pipes to or from vessels operating under gaseous pressures in order to maintain in said pipes a substantially compact column of particle form contact mass material.

When such a throttle is used, however, several difficulties may arise. If the flow of contact material is throttled at the outlet end of a drain pipe from a conversion vessel operating under a gaseous pressure substantially above that at said outlet end of said pipe, a limited quantity of gas will be forced downwardly through the contact material in said pipe due to the pressure differential. With proper design of the drain pipe, this limited quantity of gas will not amount to an appreciable percentage of the gas in the conversion vessel and its linear velocity through the drain pipe may not be objectionable. However, since the free cross section for flow at the point of throttling must necessarily be less than that in the drain pipe thereabove, the gas linear velocity at said point of throttling may become very high. This high velocity gas may be sufficient to throw the contact material particles violently against the throttling construction and the walls of the drain pipe, resulting in highly undesirable attrition and reduction in particle size of the contact material. Moreover, with every change in pressure differential between the conversion vessel and the outlet end of the drain pipe, the volumetric rate of flow of contact material through the throttling device and from the conversion vessel will change making it very difficult to maintain uniform operating conditions in the conversion vessel.

On the other hand if contact material is introduced by gravity flow through a feed pipe extending upwardly from a conversion vessel operating under a gaseous pressure substantially above that at the upper end of said feed pipe and the contact material flow is throttled near the lower end of said feed pipe, the same difficulties as above described again arise. Moreover, in such a case, the linear rate of gas flow at the location of throttling may become so high as to cause bridging of the contact material at this location resulting in partial or complete stoppage of contact material flow through the feed pipe.

A major object of this invention is the provision of a method and apparatus for transfer by gravity flow of a particle form contact mass material as a substantially compact column or columns between a removed location or zone and a vessel operating under a gaseous pressure substantially different from that at said removed location or zone, which method and apparatus avoids the difficulties hereinabove described.

Another object is the provision of a method and apparatus for introducing and withdrawing particle form solid material to or from a vessel operating under a gaseous pressure, at a controlled rate which is independent of fluctuations in the pressure within said vessel.

Another object is the provision of a method and apparatus for the continuous and uninterrupted introduction of particle form solid material, in a plurality of substantially compact streams to a conversion vessel operating under a gaseous pressure.

Another object is the provision of a method and apparatus for conducting particle form contact mass material by gravity flow from a vessel operating under a gaseous pressure to a vessel therebelow operating under a substantially different gaseous pressure, in a plurality of streams, the rate of contact material flow in each of said streams being positively controlled below a fixed maximum, said maximum being independent of fluctuations of contact material flow in said lowermost vessel or of fluctuations in pressure in either of said vessels.

These and other objects of this invention will become apparent in the following discussion of the invention.

In order to better understand the invention reference is now made to the figures attached hereto of which Figure 1 is an elevational view, partially in section, of part of a typical apparatus to which the invention may be applied and of the apparatus of this invention applied thereto, Figure 2 is a sectional elevational view of a preferred embodiment of the invention. Figures 3 through 7 inclusive are isometric views of modified forms of the invention and Figure 8 is an elevational view, in section, showing the application of another modified form of the invention. Figure 9 is a diagrammatic flow sketch of a typical operation to which the invention may be applied. All of these drawings are diagrammatic in form.

Turning now to Figure 1, we find 20 is the upper end of the shell of a conversion vessel through which particle form contact material is downwardly flowing as a substantially compact column 32. Near the top of the shell 20 is the conversion vapor outlet pipe 30 connected to said shell. Forming the top of the conversion chamber is the plate 34 extending thereacross and supported between flanges 35, said flanges serving to connect a seal section 21 to the top of the shell 20. Extending downwardly from plate 34 and terminating in the upper section of the conversion vessel below the elevation of the connection of pipe 30 thereto are the symmetrically spaced pipes 29 which serve as passageway for the contact material from the accumulation of said material 31 in the seal section 21 to the conversion vessel therebelow. Below the lower end of each pipe 29 is a small upright funnel 28 having a cross section at its upper edge greater than that of the pipe 29 and having a depending drain spout of cross section substantially less than that of the pipe 29. These funnels are spaced sufficiently below the pipe 29 as to permit free access of the vapor in the conversion vessel to the surface of the contact material in the funnel at an area approximately equal to or greater than that of the pipe 29 cross section; and the funnels may be so supported by any of a number of suitable means such as by rods 33 from pipe 29, of which one is shown. Connected into the top of the head section 21, extending a short distance down into the section 21 and extending upwardly therefrom is the pipe 24. Supported below the lower end of this pipe by rod 27 is a funnel 26, similar to those described above and similarly placed, the downspout of said funnel terminating short of the plate 34. Connected also to the section 21 is the pipe 25 with valve 61 therein. The pipe 24 connects on its upper end into the conical bottom of a supply hopper 22 to the top 62 of which hopper is connected a pipe 23 serving as a contact material supply duct from an elevator (not shown). Connected to the hopper 22 near the upper end thereof is a vent pipe 63. The pipe 24 is of sufficient length to permit maintenance therein of a compact column of contact material having a head greater than the differential in pressure between the hopper 22 and the seal section 21 of the conversion vessel. In other words the pipe 24 is of sufficient length as to permit maintenance therein, when contact material flow from the bottom thereof is throttled, a substantially compact column of downwardly flowing particle form contact material, the weight of the contact material in the entire length of a unit cross section of said column being greater in pounds than the difference in gaseous pressure, in pounds per equal unit of cross section, between the lower and upper end of said column.

In operation, regenerated particle form contact mass material, regenerated in an external regenerator (not shown) is conveyed by an elevator (not shown) to the supply pipe 23 through which it flows to the supply hopper 22. The rate of supply is such in respect to the rate of contact material withdrawal from said hopper to permit maintenance therein of a bed of said contact material. It should be understood that any other means for maintaining an accumulation of contact material above the inlet of the pipe 24 is equally applicable. For example, an enlarged continuation of the supply pipe 23 connected to the top of pipe 24 would also be suitable. The term supply hopper where used in describing this invention will be used in this broad sense. The hopper may or may not be vented to the air but is generally under a gaseous pressure below that maintained in head section 21 below. The contact material flows from said hopper through pipe 24 onto the contact material in the funnel 26 in head section 21; and the flow of contact material from pipe 24 is throttled by the accumulation of contact material in the funnel 26. The contact material from the funnel 26 drains onto the accumulation 31 of contact material therebelow in the head section. An inert seal gas is introduced through pipe 25 at a rate controlled by a differential pressure controller (not shown) and diaphragm operated valve 61 sufficient to maintain the pressure in chamber 21 somewhat above that in the space 66 in the top of vessel 20. The accumulation 31 of contact material and the substantially compact column of contact material in pipes 29 sufficiently restrict the inert gas flow from chamber 21 to space 66, to permit maintenance of such a differential pressure without requirements of undue quantities of seal gas. Since the funnel 26 is located sufficiently below the end of pipe 24 to allow a gas contacting area at 67 with the contact material column, which area is approximately equal to or greater than the cross sectional area of the pipe 24, it can be seen that there is no restriction of cross section for gas flow near the point of throttling, thereby eliminating the difficulties hereinbefore described that would result from such a restriction. Also since the gas in chamber 21 has free access to the stream of contact material issuing from the downspout of the funnel 26 the pressure at this point is substantially the same as on the surface of contact material in the funnel and there is very little gas flow through the funnel. The cross sectional area of the funnel downspout is sufficiently less than that of the pipe 24 to limit the maximum possible rate of flow from the funnel below a volumetric rate that would correspond to free flow in the pipe 24, so that the accumulation of contact material in the funnel 26 is ever present to serve as a throttle on the contact material flow from the pipe 24 regardless of fluctuations in pressure within the chamber 21. Thus the column of contact material in pipe 24 is maintained compact at all times thereby preventing excessive flow of gas from chamber 21 upwardly through pipe 24. The contact material passes from the accumulation 31 down through pipes 29 onto the accumulation of contact material in funnels 28. The placement of these funnels with respect to the lower ends of pipes 29 is similar to the placement of funnel 26 and the funnels operate in the same way discharging the contact material onto the column 32 of contact material in the conversion zone. It will be seen that the use of the funnels 28 differs from that of the funnel 26 only in that the funnel 26 is used below a feed leg of contact material flowing from a low pressure zone to a high pressure zone whereas the funnels 28 are used below legs of contact material flowing from a high pressure zone to a zone of lower pressure. Thus the funnels 28 typify the application of this invention to a contact material drain leg from a vessel operating under a gaseous pressure. The pressure on opposite ends of these funnels is that of the gas in the space 66. Reactant gases introduced at a location near the bottom of the conversion vessel (not shown) pass upwardly through the column of contact material 32 and into space 66 from which they are withdrawn through pipe 30. Alternately pipe 30 may be used for the reactant gas inlet, in which event the gaseous products would be withdrawn from the conversion vessel at a location below (not shown). Contact material is continuously withdrawn from the bottom of the convertor through a pipe (not shown) and passed to an elevator (not shown), which conveys the spent contact material to a location above a regenerator (not shown). If desired a funnel similar to that shown at 28 may be used near the lower end of the convertor drain pipe. Moreover similar arrangements may be used for introduction and withdrawal of contact material to and from the regenerator vessel, if the operating pressure therein is high.

Turning to Figure 2, we find an enlarged view of the lower end of a pipe 36 with a funnel 37 below. It may be clearly seen that the total area at the surface 39 of the contact material in the funnel 37 is greater than the cross sectional area of the pipe 36 and that the cross sectional area 38 of the funnel downspout, in this example, is substantially less than that of the pipe 36. It will also be noted that the funnel is of sufficient cross sectional size at its upper edge and its upper edge is sufficiently near the elevational plane of the lower end of pipe 36 as to prevent the contact material issuing from pipe 36 to overflow the edges of the funnel.

The means of throttling the contact material flow may take a number of forms other than that shown in Figures 1 and 2. For example, in Figure 3 is shown the lower end of a contact material feed or discharge pipe 36 extending part way down into a cylindrical shaped vessel 41 having a drain pipe 42 dependent from its bottom and being partly closed above by a frustum shaped top 68 having a hole 69 in the center thereof. Contact material is withdrawn through pipe 42 at a rate below that corresponding to the free flow in the pipe 36 and at a rate insufficient to lower the level of the accumulation of contact material within the vessel 41 below the end of pipe 36, so that the flow from pipe 36 is always throttled, thereby maintaining a substantially compact column of contact material therein. Thus it can be seen that the vessel 41 could be substituted for one of the funnels 26 or 28 in Figure 1. This modification of the invention is particularly desirable for use in locations where the contact material issuing from the pipe 36 would be subjected to direct impingement of a gas stream in a conversion vessel, said stream tending to deflect and disturb the contact material particles. The conical top 68 of the vessel 41 tends to deflect the gas streams thereby permitting only indirect contact of said gas with the contact material through hole 69.

More than one drain pipe may be used on the throttling apparatus provided the total capacity for contact material flow therethrough is less than that corresponding to free flow in the pipe from which the contact material flow is being throttled. Such an arrangement is shown in Figure 4 in which 36 is the contact material feed or discharge pipe to a vessel (not shown) in which a gaseous pressure is maintained and 45 is the means for confining a throttling accumulation of contact material therebelow and in which 70 and 71 are two symmetrically placed drain pipes therefrom having a total contact material flow capacity materially below that corresponding to free flow in the pipe 36.

In Figure 5 is shown another arrangement in which a cone 47 is used as the means for confining an accumulation of particle form solid material below the pipe 36. Solid material is drained from the cone through a plurality of symmetrically placed orifices 48 therein, said orifices having less solid material flow capacity than that corresponding to free flow in the pipe 36.

A still simpler form of the invention is shown in the isometric drawing of Figure 6, in which 36 represents the lower end of a solid material feed or drain pipe and in which 51 is a flat horizontally extending plate having a horizontal cross section somewhat greater than that of said pipe and supported by a suitable means (not shown) a short distance below the end of said pipe. The diameter of the plate and the distance of the plate below the end of the pipe 36 are controlled so that the solid material issuing from the pipe 36 onto the plate will not, due to its normal angle of repose, flow over the edge of the plate. In this respect the placement of the plate is the same as that of the upper edge of the funnel in Figure 2 or the inverted cone of Figure 5. This is a specification that should be closely followed when these modifications of the invention are used. In other words, the plate or the upper edge of the cone, basin or funnel should be so positioned with respect to the lower end of the solid material feed or drain pipe thereabove that a line extended downwardly from the periphery of the lower end of said pipe, at an angle not greater than the normal surface angle of repose of an accumulation of the particular solid material particles involved, should meet the horizontal plane through said plate or through the upper edge of said funnel, cone or basin at a point within the area covered thereby. Thus there is maintained on the plate an accumulation of solid material onto which the solid material from pipe 36 flows and which throttle the flow of said solid material from said pipe, thereby maintaining it substantially filled with a substantially compact column of particle form solid material. Solid material is withdrawn from the accumulation on the plate 51 through a number of orifices 52 therein, the total solid material flow capacity of said orifices being less than the quantity of flow corresponding to free solid material flow in the pipe 36.

Instead of using a plate with orifices therein, a solid plate may be so positioned below the pipe 36 as to permit a flow over its edges of a limited amount of solid material only, said amount again being limited below that corresponding to free flow in the pipe 36. Such an arrangement is shown in Figure 7 wherein 49 represents such a plate. Inasmuch as the correct placement of such a plate is a rather delicate procedure this latter modification is a less preferable form of the invention.

Still another modification of the invention is shown in the sectional elevation view in Figure 8 wherein 57 represents the upper end of a vessel adapted for the maintenance of a gaseous pressure therein and 36 represents the lower section of the feed pipe thereto. It will be seen that the lower end of this feed pipe 36 extends a short way into the vessel 57 and is tapered down near its end to a pipe of somewhat smaller diameter. Above the tapered extension of the pipe are a number of louvers 56 which may extend nearly around said pipe. These louvers serve to provide free access of the gas and pressure in vessel 57 to the solid material in the pipe 36 at a location therein within the vessel 57 and above the location of cross section restriction. The solid material discharges from the restricted end of the pipe into the conversion vessel and the pressure in said vessel again has free access to the solid material at the outlet of said restricted end of said pipe. Thus substantially the same pressure is maintained on either end of the restricted section of the feed pipe so that very little gas flow occurs therethrough and the difficulties heretofore arising due to throttling of solid material flow at the lower end of the feed pipe are avoided. It is obvious that such an arrangement may be used equally well on a drain pipe from a vessel operating under gaseous pressure. Care should be taken to provide enough louvered area 56 to be either equal to or greater than the cross sectional area of the pipe 36 and it will be apparent that this may be easily accomplished in this embodiment of the invention. Turning now to Figure 9, we find a diagrammatic flow sketch of a continuous hydrocarbon cracking conversion process which is typical of the processes to which the method and apparatus of this invention may be applied. In Figure 9, there is shown a catalytic reaction vessel 80, a catalyst regenerator 81, a hopper 82 above the reactor, a feed leg 83 connecting the hopper 82 with the upper end of the reaction vessel, and suitable solid material conveyors 84 and 85 for transfer of catalyst between the vessels. A seal chamber 86 is provided within the upper section of the reaction vessel and a throttling funnel 87 is provided below the feed conduit 83. Similarly, throttling funnels 88 and 89 are provided below conduits 90 and 91 respectively which are provided for catalyst passage from seal chamber 86 to the reaction zone 92.

In operation, freshly regenerated catalyst passes downwardly from surge hopper 82 through feed conduit 83 to the seal chamber 86. The length of conduit 83 is sufficient to insure gravity flow of the solid material against the gaseous pressure within chamber 86. The funnel member 87 throttles the catalyst flow from conduit 83 sufficiently to prevent a state of free flow therein. An inert gas such as steam or flue gas may be introduced into the chamber 86 via inlet 93. The rate of such seal gas introduction may be controlled by diaphragm valve 94, automatically operated by a conventional differential pressure control instrument 95 so as to maintain a slightly higher (for example, one-half pound per square inch) pressure in chamber 86 than that in the reaction zone therebelow. Catalyst flows through conduits 90 and 91 and funnel members 88 and 89 respectively from chamber 86 into the reaction zone wherein it is contacted with hydrocarbon vapors, such as gas oil vapors at a temperature of the order of 800 to 950° F. The gas oil is vaporized and heated in a conventional heating furnace (not shown) and introduced into the vessel 80 through conduit 96. Reactant products are withdrawn from the upper section of disengaging space 97 through conduit 98 to a suitable product recovery system (not shown). The pressure within the reaction zone may be controlled by means of throttle valve 107 on conduit 98 or by other conventional means. It will be apparent that the direction of vapor flow through the catalyst column within vessel 80 may be reversed by interchanging the functions of conduits 96 and 98. A purge gas such as steam or flue gas may be admitted to the lower section of the reactor through conduit 99 in order to limit the escape of hydrocarbon vapors along with the catalyst discharged through discharge conduit 100 and flow control valve 101. The spent catalyst discharged through conduit 100 is conveyed by conveyor 85 to the top of regenerator 81 through which it passes downwardly while being contacted with combustion-supporting gas such as air introduced through conduit 104 and withdrawn as flue gas through conduit 105 which gas acts to burn off the contaminant deposit. Suitable means (not shown) may be provided to control the catalyst temperature during the regeneration. Regenerated catalyst is then withdrawn from the bottom of the regenerator through conduit 102 at a rate controlled by valve 103. The regenerated catalyst is then transferred by conveyor 84 to surge hopper 82 for another cycle through the unit.

In all the above modifications of the method and apparatus of this invention, the same functions and results have been accomplished in essentially the same fundamental way. Solid material is withdrawn from a vessel to a removed zone operating at a pressure either substantially above or substantially below that in said vessel or solid material is introduced to a vessel from a removed zone operating under a pressure substantially above or substantially below that in said vessel, said solid material being introduced or withdrawn as a substantially compact elongated column or columns of downwardly flowing particle form solid material, said column or columns being maintained substantially compact by means of throttling the flow from the lower end thereof, while maintaining a substantially equal gaseous pressure in said column immediately above and below the location of throttling. Thus the tendency for gas flow through the solid material flowing through the throttle apparatus is eliminated and with it the difficulties arising therefrom. Moreover, the rate of solid material flow from the feed or discharge pipes is throttled below a rate corresponding to free flow in the main feed or discharge pipe. In many operations, especially when the invention is used in connection with solid material feed pipes to conversion vessels, the solid material may discharge directly from the throttling apparatus onto a bed or column of solid material flowing downwardly through the conversion vessel as a substantially compact column, the rate of flow of which is controlled by a control mechanism on the solid material discharge pipe from the bottom of the vessel. In this case the rate of flow of solid material from the throttle apparatus may be ordinarily far below the maximum possible flow therefrom and the feed pipe would necessarily flow full of solid material, but in event of sudden surges in the rate of flow of the solid material column in the conversion zone, or in event of gas rates through said column sufficient to cause boiling and turbulence of the solid material therein, the throttle apparatus will afford full protection to the solid material feed pipe to said convertor and prevent surging flow of solid material therefrom or partial loss of the substantially compact column of solid material therein, which might, in turn, result in complete stoppage of solid material feed and loss of pressure in the conversion vessel necessitating the complete cessation of its operation. Thus in such an application the invention would serve as an insurance against interruptions in operation caused by sudden and temporary surges of gaseous or solid material in the conversion vessel. Moreover if the throttle device is used as a means for solid material rate of flow control at the lower end of a feed or drain pipe to or from a vessel operating under pressure, since there is substantially no gas flow through the location of flow throttle and substantially no pressure differential thereacross, the rtae of flow of said solid material is controlled constant and uniform regardless of pressure fluctuations in the pressure vessel or in the delivery zone.

In all the modifications of the invention the same relation exists between size of solid material drain pipes or orifices from the throttle apparatus and that of the feed pipe or drain pipe controlled, namely that the total cross sectional area of the throttle apparatus drain pipes or orifices must be such that the maximum possible rate of solid material flow therethrough, that is, the flow at free flow condition, should be less than that rate of solid material flow which would be obtained under free flow conditions (unthrottled flow) from the vessel feed or discharge pipe itself under the existing conditions of gaseous pressure differential between the ends of said feed or discharge pipe and with free undisturbed flow of solid material to the upper end of said feed or discharge pipe from an accumulation of said solid material. It will become apparent that the proper ratio of the cross sectional area of the thorttle device solid material discharge pipes or orifices to the cross sectional area of the feed or drain pipe from which the contact material flow is being throttled will vary depending upon the nature of the pressure differential between the ends of said feed or drain pipe and upon whether the throttle device is to be used as a means of flow regulation and control or merely as a means to insure a compact column of solid material in the feed or discharge pipes to or from the pressure vessel. Thus, if the throttle device were to be used for the latter purpose only and if the gaseous pressure on the upper end of a drain pipe from a given vessel were considerably above that at its lower end, the rate of solid material flow through said pipe under free flow conditions might be considerably higher than it would be without such a differential. Thus the maximum possible flow of solid material through discharge orifices or pipes in the throttle apparatus having a cross sectional area equal or even slightly greater than that of the drain pipe might be less than that corresponding to free flow under the above conditions from the drain pipe. This is so since there is essentially no pressure differential across the orifices or discharge pipes from the throttle apparatus. It is usually preferable, however, to limit the cross sectional area of the discharge orifices or pipes from the throttle apparatus substantially below that of the feed or drain pipe controlled thereby.

It should be noted in this connection that when the throttle device is to be used as a means of solid material flow rate regulation, it may be desirable to construct the device in such a way as to permit variation of the area of the throttle cross section, in which event the upper maximum limit of an area permitting a rate of flow slightly less than that corresponding to free flow in the feed or drain pipe from the vessel would still be the controlling limit.

In connection with the pressure equalization feature of this invention, care should be taken that the area provided for access of the desired gaseous pressure to the solid material column in the feed or drain pipe above the location of the throttle is approximately equal to or greater than the cross sectional area of said feed or drain pipe. Also free access of an equal gaseous pressure to the contact material issuing from the throttle location should be provided.

It should be understood that all the foregoing illustrations and examples of the method and apparatus of this invention have been intended merely as illustrative and are in no way intended to limit the scope of this invention or the application thereof. It should be further understood that the term conversion vessel or converter as used in the description and claiming of this invention are equally applicable to any vessel wherein is maintained a gaseous pressure or vacuum, regardless of its function or use as well as to a vessel wherein is conducted a gasiform conversion in the presence of a particle form solid contact mass material.

I claim:

1. A method of conducting particle form solid contact mass material from an elevated zone to a second zone therebelow wherein a gaseous pressure is maintained in one of said zones above that in the other of said zones comprising the steps: flowing said contact material from said uppermost zone as a substantially compact confined column of downwardly flowing particle form contact mass material onto an accumulation of said contact material in said lowermost zone, said accumulation serving to throttle the flow of contact material from said column and having at its broadest point a cross sectional area substantially less than that of said second zone and greater than that of said column; withdrawing at least one stream of contact material, symmetrically located with respect to said column, from said accumulation; controlling the rate of contact material flow in said stream substantially below the possible rate of supply of contact material from said column to said accumulation, while freely exposing the surface of said accumulation and the withdrawal stream therefrom to the gaseous pressure within said lowermost zone.

2. A method of conducting gasiform reaction in the presence of a moving particle form contact mass material comprising: maintaining a substantially compact bed of downwardly flowing particle form contact mass material in a confined conversion zone; continuously withdrawing spent contact material from the bottom of said bed at a controlled rate; continuously regenerating said spent contact material in a separate regenerating zone; continuously conveying said regenerated contact material to a supply zone located elevationally above said conversion zone, said supply zone being under a relatively low gaseous pressure; continuously flowing said contact material from said supply zone as a substantially compact, confined column of downwardly flowing particle form contact mass material onto an accumulation of contact material in a pressure seal zone, said pressure seal zone being under a gaseous pressure substantially above that in said supply zone and being located sufficiently below said supply zone to permit a head of contact material in said column substantially greater than the differential pressure between said supply zone and said seal zone; controlling the volumetric rate of flow of said contact material at a location adjacent the lower end of said column so as to maintain said column substantially compact throughout its length thereabove, while permitting free access of the pressure existing in said seal zone to said column above the location of rate control; continuously flowing contact material from the bottom of said accumulation in said seal zone in a plurality of substantially compact elongated streams of contact material onto an equal plurality of limited accumulations of contact material located in a vapor disengaging zone therebelow, said disengaging zone being under a reactant vapor pressure substantially below the pressure in said seal zone, and said accumulations serving to throttle the flow of contact material from said streams and said accumulations having a total cross sectional area substantially less than that of said disengaging zone; withdrawing contact material from each of said accumulations at a volumetric rate of flow substantially below the possible volumetric rate of free flow in each of said streams, while freely exposing the surface of said accumulations and the withdrawal streams therefrom to the reactant vapor pressure within said disengaging zone, and directing said contact material onto the top of said bed of contact material in said conversion zone thereby continuously replenishing said bed; continuously introducing reactant vapors adjacent the lower end of said bed in said conversion zone and passing said vapors upwardly through said bed of contact material and disengaging said vapors from the surface of said bed below said disengaging zone; finally flowing said vapors upwardly through said disengaging zone and withdrawing them therefrom while at the same time introducing sufficient inert seal vapor above the accumulations of contact material in the seal zone to maintain the pressure in said seal zone substantially above that in said disengaging zone.

3. A method for introducing particle form contact mass material to a conversion zone from an outside zone located thereabove and under a gaseous pressure substantially different from that in said conversion zone comprising: flowing said contact material from said uppermost zone as a substantially compact column of particle form contact mass material onto an accumulation of contact material adjacent the upper end of said conversion zone, said accumulation serving to throttle the flow of contact material from said column and having a maximum horizontal cross sectional area substantially less than that of said conversion zone; withdrawing a plurality of streams of contact material, symmetrically located with respect to said column from said accumulation, the total volumetric rate of contact material flow in said streams being positively controlled so as to maintain said column substantially compact throughout its length thereabove, while freely exposing the surface of said accumulation and the withdrawal streams therefrom to the gaseous pressure within said conversion zone; passing said contact material from said accumulation into the conversion zone therebelow and finally withdrawing it therefrom while introducing reactant vapors to said conversion zone, contacting said vapors with said contact material and withdrawing reaction products from said conversion zone.

4. In an apparatus for conducting catalytic conversion of hydrocarbons, a conversion chamber; hydrocarbon vapor inlet and conversion product outlet adjacent opposite ends thereof; means associated with said inlet and outlet to control gaseous pressure in said conversion chamber; a second chamber located above said conversion chamber; means to continuously supply particle form catalyst to said second chamber at a rate sufficient to maintain a bed of such catalyst therein and means to introduce a gaseous pressure therein substantially higher than the pressure in said conversion chamber; an elongated conduit depending from the bottom of said second chamber for the passage of catalyst therefrom; said conduit terminating within said conversion chamber below the upper end thereof; a basin supported within said conversion chamber below the end of said conduit having downwardly sloping converging sides, the upper edges of which are sufficiently high with respect to the lower end of said conduit to prevent the overflow of catalyst from said basin and the horizontal cross sectional area of said basin being at its widest plane substantially less than that of said conversion chamber and greater than that of said conduit; members to rigidly support said basin within said conversion chamber; an outlet near the convergence of the sides of said basin for catalyst flow therefrom down into said conversion chamber, said outlet being sufficiently restricted in size to limit the rate of catalyst flow from said basin below that corresponding to free flow in said conduit; and finally a pipe connected near the lower end of said conversion chamber for outlet of catalyst therefrom.

5. In an apparatus of the type described, a conversion vessel; a gasiform reactant inlet and a conversion product outlet associated therewith for controlling the gaseous pressure in said vessel; a contact mass material outlet connection near the bottom of said vessel; a contact mass material inlet pipe extending through the top of said vessel and terminating within the upper section thereof and extending upwardly from said vessel to a sufficient height to provide a head of substantially compact particle form contact material therein greater than the pressure differential between the ends of said pipe; means for continuously supplying contact material to the upper end of said pipe; a basin, open on top, supported within said conversion vessel below the lower end of said pipe having downwardly sloping converging sides, the upper edges of which extend sufficiently high with relation to the lower end of said pipe as to substantially prevent the overflow of contact material from said basin, and the horizontal cross sectional area of said basin at its widest point greater than that of said pipe and less than that of said conversion vessel thereby permitting free access of the vapors in said vessel to the surface of the contact material in said basin, said converging sides having an outlet for contact material near the location of convergence, said outlet having a cross sectional area substantially less than that of said pipe and being in free access to the gaseous pressure within said vessel, and means to rigidly support said basin within said conversion vessel.

6. An apparatus for introducing particle form catalytic material into a conversion vessel operating under a gaseous pressure comprising: hopper means confining a supply body of particle form catalyst located elevationally above said conversion vessel; an outlet from said hopper means; an elongated pipe depending from said outlet to said conversion vessel, said pipe being connected to the top of said conversion vessel and extending a short distance down within the upper section of said vessel; throttle means confining a limited accumulation of catalyst within said vessel immediately below the lower end of said pipe, said accumulation serving to throttle the flow of catalyst from said pipe, and said throttle means having side walls impervious to the lateral flow of catalyst therethrough and of sufficient height with respect to the lower end of said pipe to prevent overflow of catalyst and to prevent the direct impingement of the vapor stream in said vessel upon the catalyst issuing from said pipe, and side walls confining an accumulation of catalyst of horizontal cross section substantially less than that of said conversion vessel and greater than that of said pipe, and said throttle means being substantially open on top so as to permit free access of vapors in said conversion vessel to the surface of said confined accumulation, and said throttle means having a catalyst tight bottom; a catalyst outlet in said bottom, said outlet being sufficiently restricted in size to limit the rate of catalyst flow from said confined accumulation below that corresponding to free catalyst flow in said pipe, and said outlet being in free access to the vapor in said conversion vessel.

7. An apparatus for introducing particle form solid material to a vessel operating under a gaseous pressure from an external supply hopper thereabove under a substantially different gaseous pressure comprising: an elongated pipe connected between said external supply hopper and said vessel and extending a short distance within the upper section of said vessel; a perforated plate supported within said vessel below the lower end of said pipe, said plate being of sufficient horizontal cross section that a line extended from any point on the inner periphery of the outlet end of said pipe downwardly and at an angle equal to the angle of repose of said particle form solid material will not intersect the horizontal plane of said plate beyond the edges of said plate, and said plate being of a horizontal cross section substantially less than that of said vessel, said perforations in said plate being of sufficient size to permit the flow therethrough of said particle form solid material and the total cross section of said perforations being such as to limit the solid material flow therethrough below that which would substantially reduce the accumulation of said solid on said plate.

8. In an apparatus for continuously introducing particle form contact mass material to a conversion vessel wherein said contact material is contacted with a gasiform reactant, a vessel confining a conversion zone and having connections adjacent its opposite ends for introducing and withdrawing a gasiform reactant under pressure; a contact material drain pipe adjacent the lower end of said vessel; a longitudinal contact material feed conduit connected near the upper end of said vessel and extending upwardly therefrom; a supply hopper connected near the upper end of said conduit; means to supply particle form contact mass material to said hopper at a rate sufficient to maintain a bed of contact material therein; means confining an accumulation of said contact material within said conversion vessel, adjacent the lower end of said conduit, said confining means being open on top for access of contact material from said feed conduit and for access of the gaseous pressure within said conversion vessel onto the surface of said accumulation of contact material and said confining means having a horizontal cross-section near its top substantially greater than that of said conduit and substantially less than that of said conversion vessel, at least one member to rigidly support said confining means within said conversion vessel, at least one outlet from the bottom of said confining means for flow of contact material from said accumulation to a location within said conversion vessel therebelow, said outlet providing substantially more restriction to contact material flow than the internal cross-section of said conduit under existing operating conditions.

9. In an apparatus for conducting conversion of hydrocarbons in the presence of a particle-form solid contact material, a conversion chamber; a hydrocarbon charge inlet to said chamber and a hydrocarbon product outlet from said chamber spaced from said inlet; a second chamber located above said conversion chamber; means to continuously supply particle-form contact material to said second chamber at a rate sufficient to maintain a bed of such contact material therein and means to maintain a gaseous pressure therein greater than the gaseous pressure in said conversion chamber; an elongated conduit depending from the bottom of said second chamber for passage of contact material therefrom; said conduit terminating within said conversion chamber below the upper end thereof; a basin, supported within said conversion chamber below and sufficiently near the lower end of said conduit to prevent the overflow of contact material from said basin and the horizontal cross-sectional area of said basin being at its widest plane substantially less than that of said conversion chamber and greater than that of said conduit; at least one member adapted to rigidly support said basin within said conversion chamber; an outlet on the bottom of said basin for contact material flow therefrom down into said conversion chamber, said outlet being sufficiently restricted in size to limit the rate of contact material flow from said basin below that corresponding to free flow in said conduit; and finally a pipe connected near the lower end of said conversion chamber for outlet of contact material therefrom.

THOMAS P. SIMPSON.

REFERENCES CITED

The following references are of record in the file of this patent:

UNITED STATES PATENTS

| Number | Name | Date |
|---|---|---|
| 727,030 | Tilghman | May 5, 1903 |
| 1,478,405 | Smith | Dec. 25, 1923 |
| 2,240,347 | Page et al. | Apr. 29, 1941 |
| 2,274,003 | Sheppard | Feb. 24, 1942 |
| 2,290,580 | Degnen et al. | July 21, 1942 |
| 2,303,717 | Arveson | Dec. 1, 1942 |
| 2,312,006 | Thiele | Feb. 23, 1943 |
| 2,314,316 | Schlesman | Mar. 16, 1943 |
| 1,158,624 | Brantingham I | Nov. 2, 1915 |
| 1,178,465 | Brantingham II | Apr. 4, 1916 |
| 2,341,193 | Scheineman | Feb. 8, 1944 |
| 2,298,593 | Rubin et al. | Oct. 13, 1942 |
| 2,304,827 | Jewell | Dec. 15, 1942 |